(12) United States Patent
Shimada et al.

(10) Patent No.: US 6,520,603 B2
(45) Date of Patent: Feb. 18, 2003

(54) LOW-NOISE ENDLESS CRAWLER BELT HAVING EMBEDDED CORE BARS AND DETACHABLE CRAWLER SHOES

(75) Inventors: Yoshihide Shimada, Sakaki-machi (JP); Kazuyuki Kobayashi, Sakaki-machi (JP)

(73) Assignee: Takeuchi Mfg, Co., Ltd., Nagano (JP)

( * ) Notice: Subject to any disclaimer, the term of this patent is extended or adjusted under 35 U.S.C. 154(b) by 0 days.

(21) Appl. No.: 09/809,522

(22) Filed: Mar. 15, 2001

(65) Prior Publication Data

US 2002/0130551 A1 Sep. 19, 2002

(51) Int. Cl.⁷ ............................................... B62D 55/24
(52) U.S. Cl. .................... 305/167; 305/171; 305/177; 305/180
(58) Field of Search ............... 305/167, 170, 305/171, 173, 174, 176, 177, 180, 181

(56) References Cited

U.S. PATENT DOCUMENTS

| | | | |
|---|---|---|---|
| 1,814,046 A | * | 7/1931 | Kegresse |
| 2,064,890 A | * | 12/1936 | Dorst |
| 2,392,988 A | * | 1/1946 | Keck |
| 2,461,150 A | * | 2/1949 | Flynn et al. |
| 3,345,113 A | * | 10/1967 | Siber |
| 3,899,220 A | * | 8/1975 | Grawley et al. |
| 4,281,882 A | * | 8/1981 | van der Lely |
| 4,560,211 A | * | 12/1985 | van der Lely |
| 4,687,261 A | | 8/1987 | Atkin ..................... 305/57 |

FOREIGN PATENT DOCUMENTS

| | | | | |
|---|---|---|---|---|
| DE | 90 12 707 | | 8/1990 | |
| EP | 6301 | * | 1/1980 | ............. 305/167 |
| EP | 0 334 326 A2 | | 9/1989 | |
| EP | 0 497 597 A1 | | 8/1992 | |
| GB | 2 229 410 A | | 9/1990 | |
| JP | 52-2925 | * | 1/1977 | |
| JP | 57-144174 | * | 9/1982 | ............. 305/174 |
| JP | 1-240384 | * | 9/1989 | ............. 305/177 |
| JP | 4-151385 | * | 5/1992 | ............. 305/177 |
| JP | 4-133882 | * | 7/1992 | |

\* cited by examiner

Primary Examiner—Russell D. Stormer
(74) Attorney, Agent, or Firm—Klauber & Jackson

(57) ABSTRACT

The crawler belt 20 is structured of a plurality of inner shoes 21; a plurality of outer shoes 30 arranged to oppose each of the inner shoes; an endless ring-shaped rubber belt member 26 retained between the inner shoes and outer shoes respectively opposing each other; and an endless ring-shaped steel wire 27 embedded in the belt member extending in the longitudinal direction. The inner shoes 21 are arranged side by side along the inner periphery of the belt member, the outer shoes are arranged side by side along the outer periphery of the belt member, and concave portions are arranged in the longitudinal direction between the inner shoes and formed openly toward the inner periphery for receiving the sprocket teeth. Thereby, it is possible to reduce the travel noise while maintaining the advantages of the strength, durability and repairability of steel crawler belts.

8 Claims, 6 Drawing Sheets

LOW-NOISE ENDLESS CRAWLER BELT HAVING EMBEDDED CORE BARS AND DETACHABLE CRAWLER SHOES

FIELD OF THE INVENTION

The present invention is directed to an endless ring-shaped crawler belt which is placed around a pair of crawler wheels and rotatably driven between such crawler wheels when one of the crawler wheels is rotatably driven.

Further, there are those in which the pair of crawler wheels is respectively structured of a sprocket wheel comprising sprocket teeth for driving one of the crawler wheels, and those in which one is a sprocket wheel and the other is a sprocketless cylindrical idler wheel for driving the sprocket wheel. Such sprocket wheels and idler wheels are hereinafter collectively referred to as crawler wheels.

BACKGROUND OF THE INVENTION

This type of crawler belt is generally used on vehicles known as crawler vehicles. The ground pressure of crawler vehicles is low, and they are therefore employed for various uses; for example, construction machinery, as such crawler vehicles are capable of travelling at locations with unfavorable road conditions where ordinary vehicles with tire wheels are not able to run. As conventional crawler belts, known are steel crawler belts structured in a ring shape by linking metal shoes, and rubber crawler belts reinforced with steel wires and the like. Rubber crawler belts are often used with vehicles that sometimes travel on open roads since such belts do not damage the road surface and generate little travel noise. Nevertheless, such rubber crawler belts have problems in that the strength and durability are inferior in comparison to crawler belts structured by linking steel shoes, and in that it is necessary to replace the entire crawler belt even in cases where only a part of the crawler belt is damaged (particularly the travel face which contacts the ground). Thus, it is often necessary to utilize steel crawler belts in such cases.

Here, the steel crawler belt is superior in strength and durability and there is an advantage in that the respective shoes may be replaced or repaired separately, but there is a problem in that the travel noise from the crawler belt during the traveling motion is loud. Specifically, the faster the travelling speed, the louder the noise at an accelerated tempo. This noise is caused by the sound generated upon the connections linking the respective shoes colliding with the crawler wheel, and the sound continuously generated when the crawler belt is pulled and wound inside the drive crawler wheel and vigorously collides with the sprocket teeth of the crawler wheel structured of a sprocket wheel.

SUMMARY OF THE INVENTION

An object of the present invention is to provide a low-noise type steel crawler belt having a structure capable of reducing the travel noise while maintaining the advantages of the strength, durability and easy repairs that steel crawler belts have.

According to the present invention, an endless ring-shaped crawler belt, which is mounted on and round a pair of front and rear crawler wheels and rotatably driven between the pair of crawler wheels by rotatably driving at least one of the crawler wheels, comprises: a multiplicity of inner shoe members made of steel; a multiplicity of outer shoe members made of steel and arranged to oppose the inner shoe members, respectively; an endless ring-shaped rubber belt member retained between the inner shoe members and outer shoe members respectively opposing each other; and an endless ring-shaped steel wire member embedded in the belt member so as to extend in the longitudinal direction. The inner shoe members are arranged side by side along the inner periphery of the belt member, the outer shoe members are arranged side by side along the outer periphery of the belt member, and a multiplicity of concave portions, which are formed side by side in the longitudinal direction between the inner shoes so as to open toward the inner periphery, receive the sprocket teeth so that the crawler belt is passed round the crawler wheels.

With a crawler belt structured as described above, the crawler wheel contacts the steel inner shoe members and engages with the crawler belt, and it is thereby possible to secure the strength of the portion contacting the crawler wheel and to improve the strength and durability of the crawler belt. Further, as the steel outer shoe members mounted on the outer periphery contact the road surface, it is also possible to improve the strength and durability of such portion. And when such steel outer shoe members become worn or damaged, it is possible to independently replace each of such outer shoe members. Repair may thereby be conduced easily and at low cost. In addition, as a rubber belt member is retained between the inner and outer shoe members and such inner and outer shoe members are mounted side by side in the longitudinal direction, the noise caused by the impact of the inner shoe members and the crawler wheel is absorbed by the rubber belt member, and the travel noise is reduced thereby. Moreover, as a wire member embedded in the belt member is formed in a ring shape so as to circumvent the crawler belt, the tensility of the wire member inhibits the crawler belt from being pulled inside upon being wound into the crawler wheel. Thus, the force of the impact of the inner shoe members and the crawler wheel is weakened, and the travel noise is reduced thereby.

It is preferable that the inner shoe members are embedded in the belt member and integrated thereto in a state where the portion contacting the crawler wheel at the inner periphery and the portion connected to the outer shoe members at the outer periphery are exposed, and the outer shoe members are connected to the inner shoe members by means of bolts at the outer exposed portion of the inner shoe members. Thereby, it is possible to connect the inner shoe members in an endless ring shape while being arranged side by side on the inner face with the belt member, and a crawler belt may be prepared by respectively connecting the outer shoe members with bolts to the portion exposed to the outer face of the inner shoe members. Thus, it is possible to easily attach and detach the respective outer shoes independently. And when such outer shoe members contacting the road surface during the traveling motion become worn or damaged, it is possible to independently and easily replace each of such outer shoe members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 2:
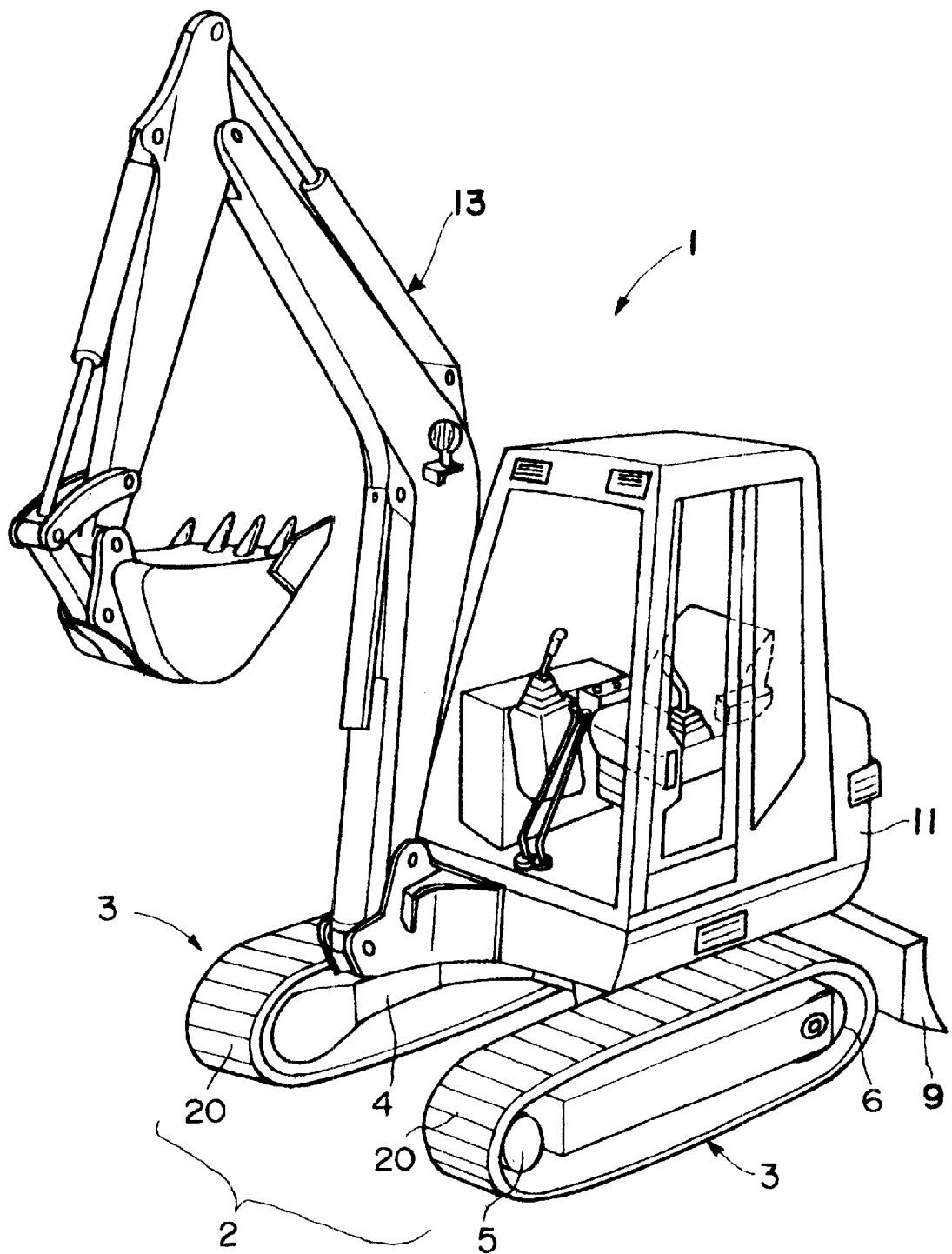
FIG. 2 is a perspective view showing the power shovel vehicle employing the crawler belt according to the present invention.

The preferred embodiments of the present invention are now described with reference to the relevant drawings. FIG. 2 shows a crawler-type power shovel vehicle 1 employing the low-noise type steel crawler belt of this invention. This power shovel vehicle 1 comprises a travel dolly 4 having a travel device 2 structured with a pair of left and right crawler belts 20, a blade 9 provided to move freely upward and downward in an oscillatable manner at the rear of this travel dolly 4, a swivel slide 11 provided swivelably on the travel dolly 4, a power shovel mechanism 13 pivotally supported at the front portion of the swivel slide 11, and an operator cabin 15 provided on the swivel slide 11.

The travel device 2 comprises a travel dolly 4 having an approximate H shape, and a travel mechanism 3 provided on the left and right sides of this travel dolly 4. The travel mechanism 3 comprises a drive sprocket wheel 5 (crawler wheel) provided in the front part of the left and right sides of this travel dolly 4, an idler wheel 6 (crawler wheel) provided at the rear thereof, and a crawler belt 20 placed around both wheels 5 and 6 and driven thereby.

Figure 1:
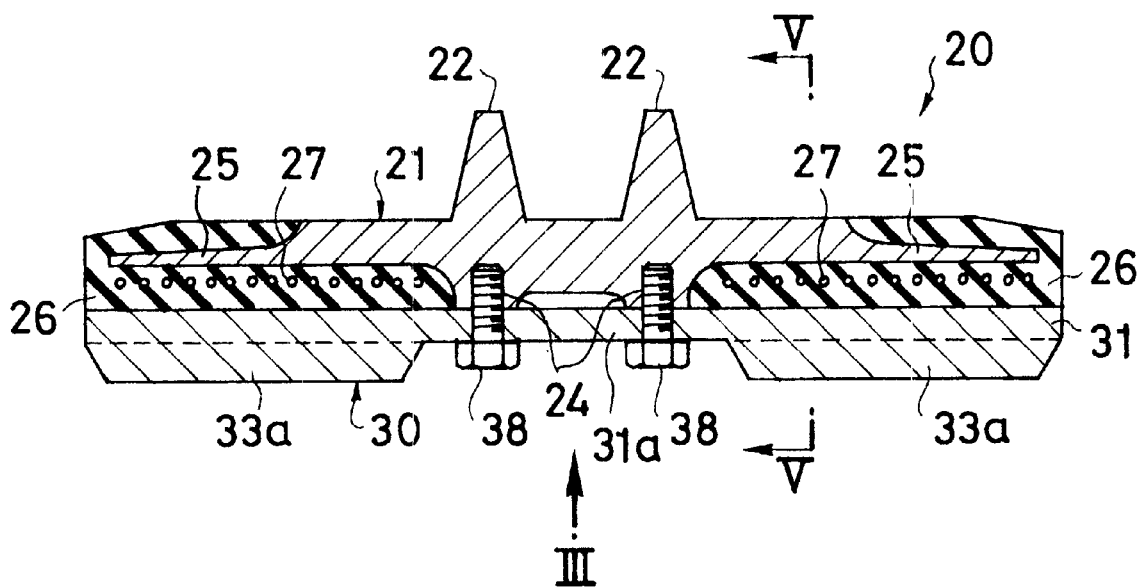
FIG. 1 is a cross section showing the structure of the crawler belt according to the present invention.

This crawler belt 20 is the low-noise type steel crawler belt of the present invention, and the structure thereof is described below. FIG. 1 shows the cross section in the width direction of the crawler belt 20, and FIGS. 4 and 5 respectively show the plan view and cross section along arrow V—V of FIG. 1. The crawler belt 20 is formed in an endless ring shape by integrally molding a plurality of steel inner shoes 21 to be arranged side by side in a ring shape with a rubber belt member 26. Here, simultaneously, a plurality of steel ring-shaped wires 27 is embedded in the belt member 26 in order to provide the belt member 26 with sufficient tensile strength.

The inner shoes 21 are members slenderly extending in the width direction (horizontal direction) and rectangular from a plan view, the midsection of the inner face side is exposed to the inner periphery of the belt member 26, and a pair of guide protrusions 22 are protusively formed on the inside of this exposed face. Moreover, the left and right ends 25 are embedded in the belt member 26. The left and right sides of the outer face side of the inner shoes 21 are covered with the belt member 26 while the midsection thereof is left intact, and a plurality of ring-shaped wires 27 is embedded and positioned symmetrically in the belt member 26 at such portion. Further, screws 24 are respectively formed at four locations at the portions exposed to the outer face side of the inner shoes 21.

Figure 4:
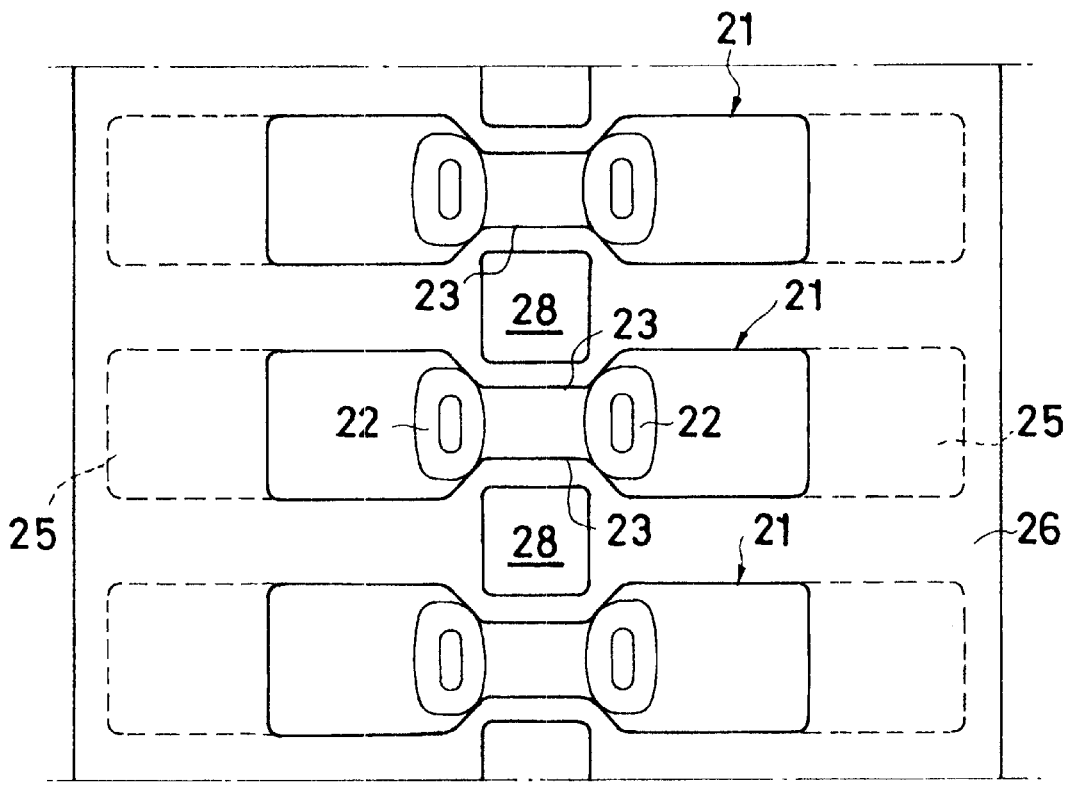
FIG. 4 is a plan view of the aforementioned crawler belt.
Figure 5:
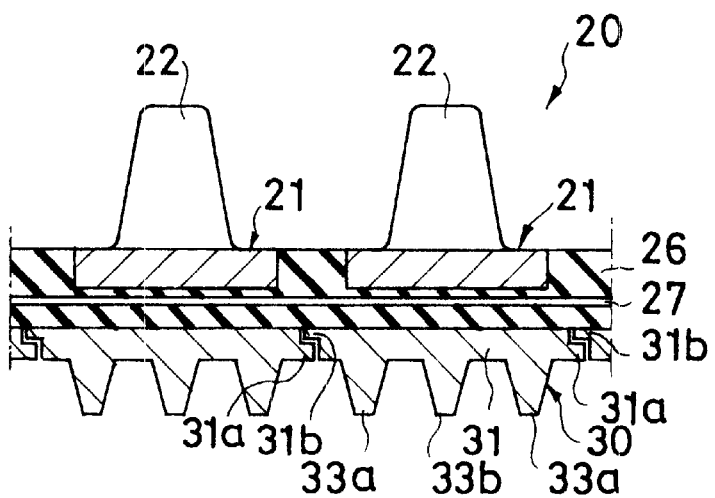
FIG. 5 is a cross section showing the aforementioned crawler belt along arrow V—V.

As clear from FIG. 4, the midsection of the inner shoe 21 has a constriction 23 where the dimension is decreased in longitudinal direction (front and back direction), and concave portions 28 are formed between the constrictions 23 of the adjacent inner shoes 21. The concave portions 28 may penetrate to the outer face side. These concave portions 28 receive the sprocket teeth when the crawler belt 20 is placed around the sprocket wheel. Here, the sprocket wheel is positioned between the left and right protrusions 22 of the inner shoes 21 and guided by such left and right protrusions 22. The inside of the concave portion 28 is enclosed with rubber structuring the belt member 26, and the noise caused by the impact of the sprocket teeth and inner shoes 21 is thereby reduced. Nevertheless, the constriction 23 may be exposed to the outer face of the concave portion 28 such that the sprocket teeth directly contact the inner shoes 21 in such constriction 23 so as to improve the strength and durability of the crawler belt.

Figure 3:
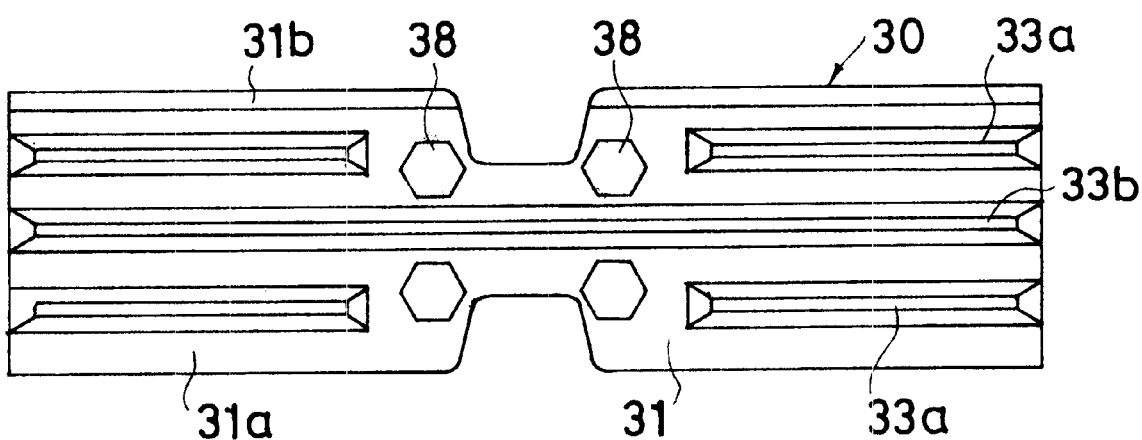
FIG. 3 is a bottom view showing the outer shoe structuring the aforementioned crawler belt along arrow III of FIG. 1.

As described above, a ring-shaped member is structured by uniformly disposing a plurality of inner shoes 21 in equal intervals on the inner periphery of the endless ring-shaped belt member 26, and a crawler belt 20 is structured by mounting a plurality of outer shoes 30 on the outer periphery of this ring-shaped member. As evident from FIG. 1 and FIG. 3, the outer shoes 30 are connected to the respective inner shoes 21 with four bolts 38 to be screwed with screws 24 and mounted side by sided in the longitudinal direction of the outer periphery of the belt member 26. An outer shoe 30 is formed of a flat, rectangular plate 31 and a plurality of claws 33a and 33b formed on the outer face side of the plate 31, and is connected to the inner shoe 21 at the center of the plate 31 with bolts 38. Here, the inner face of the plate 31 sandwiches and retains the belt member 26 between itself and the inner shoe 21. As clear from FIG. 3, an outer guide 31a and an inner guide 31b are formed at the front and rear of the plate 31, the outer guide 31a is placed over the inner guide 31b of adjacent outer shoes 30, and the front face of the outer periphery of the belt member 26 covers the outer shoes 30, thereby preventing the exposure of the belt member 26 to the outer periphery.

The crawler belt 20 structured as above receives the sprocket teeth in the concave portion 28, and is placed around the drive sprocket wheel 5 and the floating idler wheel 6 by positioning the sprocket wheel between the left and right protrusions 22 of the inner shoes 21, and being guided thereby. With this type of crawler belt 20, the outer shoes 30 contact the ground and the inner shoes 21 contact the wheels 5 and 6. However, as these shoes 21 and 30 are steel, the strength and abrasion resistance are superb, and considerable durability can be obtained thereby. Moreover, although the outer shoes 30 are most easily worn or damaged as a result of contacting the ground, as it is possible to individually attach and detach the outer shoes 30 in the event of such wear or damage, the durability of the overall crawler belt is improved.

Further, as the rubber belt member 26 is retained between the inner shoes 21 and the outer shoes 30 in this crawler belt 20, the noise caused by the impact of the inner shoes 21 and the wheels 5 and 6 and by the contact of the outer shoes 30 and the ground is absorbed by the belt member 26, and the noise from the crawler belt 20 during the traveling motion can be significantly reduced. Particularly, although the inner shoes 21 and the outer shoes 30 facing each other are integrally connected with bolts 38, the adjacent shoes are connected via the belt member 26, and this yields a considerable noise-reduction effect as the sound and vibration to the adjacent shoes are significantly suppressed by the belt member 26. As the belt member 26 is reinforced with the wire 27, when the crawler belt 20 is pulled into the drive sprocket wheel 5, the tensility of the wire 27 opposes the force pulling the crawler belt 20 toward the inside (sprocket side). Thereby, the force of the impact upon the crawler belt 20 being pulled inward and contacting the sprocket wheel is reduced, and the generation of the impact noise is suppressed as a result thereof.

Figure 6:
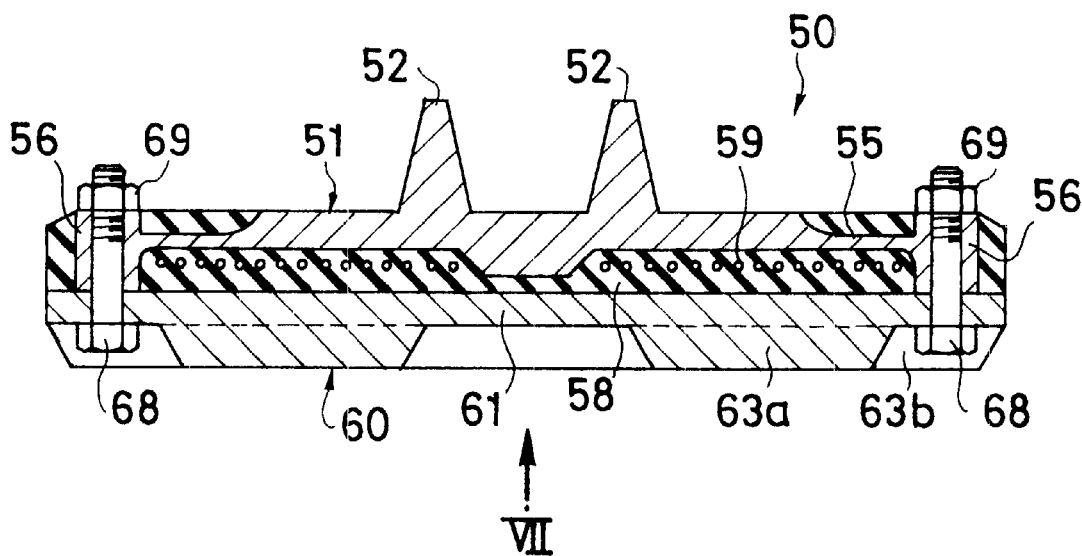
FIG. 6 is a cross section showing the structure of the crawler belt according to another embodiment of the present invention.
Figure 7:
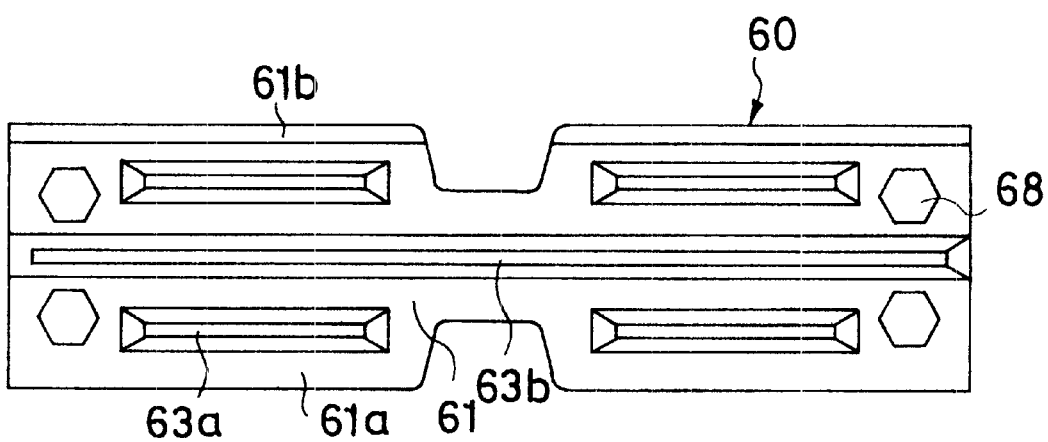
FIG. 7 is a bottom view of the outer shoe structuring the aforementioned crawler belt along arrow VII of FIG. 6.

Next, another embodiment of the crawler belt of this invention is described with reference to FIG. 6 and FIG. 7. This crawler belt 50 is structured in an endless ring shape by uniformly forming a plurality of steel inner shoes 51 to be arranged side by side in a ring shape with a rubber belt member 58. And a plurality of ring-shaped wires 59 is embedded and molded in the belt member 58 in order to provide sufficient tensility to the belt member 58.

The inner shoes 51 are rectangular members extending slenderly and horizontally, the midsection of the inner face side is exposed to the inner periphery of the belt member 58, and a pair of guide protrusions 52 is formed on the inside of this exposed face. The midsection 55 at the left and right of the inner shoe 51 is exposed to the inner and outer periphery of the belt member 58 in the left and right ends 56 to which the belt member 58 is embedded, and bolt-insertion holes penetrating from the inside to the outside are formed at such left and right ends 56. Ring-shaped wires 59 are embedded in the belt member 58 at the outer face side of the inner shoes 51. In a state where the belt member 58 is embedded in and integrally molded with the inner shoes 51, similar to the crawler belt 20 shown in FIGS. 1–5, a constriction is formed at the midsection of the inner shoe 51 and a concave portion for receiving the sprocket teeth is formed between the constrictions of the adjacent inner shoes 51.

As described above, a ring-shaped member is structured by uniformly disposing a plurality of inner shoes 51 in equal intervals on the inner periphery of the endless ring-shaped belt member 58, and a crawler belt 50 is structured by mounting a plurality of outer shoes 60 on the outer periphery of this ring-shaped member. The outer shoes 60 are connected to the respective inner shoes 51 by means of bolts 68 inserted into bolt insertion holes at the left and right ends 56 of the inner shoes 51 and by means of nuts 69 screwed on the bolts 68, and are mounted side by side in the longitudinal direction of the outer periphery of the belt member 58. An outer shoe 60 is formed of a flat, rectangular plate 61 and a plurality of claws 63*a* and 63*b* formed on the outer face side of the plate 61, and is connected to the inner shoe 51 at the left and right ends of the plate 61 with bolts 68 and nuts 69. Here, the inner face of the plate 61 sandwiches and retains the belt member 58 between itself and the inner shoe 51. An outer guide 61*a* and an inner guide 61*b* are formed at the front and rear of the plate 61, and the outer guide 61*a* is placed over the inner guide 61*b* of adjacent outer shoes 60, thereby preventing the exposure of the belt member 58 to the outer periphery.

The crawler belt 50 structured as above receives the sprocket teeth in the concave portion, and is placed around the drive sprocket wheel 5 and the floating idler wheel 6 by positioning the sprocket wheel between the left and right protrusions 52 of the inner shoes 51, and being guided thereby. With this type of crawler wheel 50 also, the inner and outer shoes 51 and 60 are steel, and the strength and abrasion resistance are superb, and considerable durability can be obtained thereby. Moreover, it is possible to individually attach and detach each of the outer shoes 60. Further, as a rubber belt member 58 is retained between the inner shoes 51 and the outer shoes 60, the noise caused by the impact of the inner shoes 51 and the sprocket wheels and by the contact of the outer shoes 60 and the ground is absorbed by the belt member 58, and the noise from the crawler belt 50 during the traveling motion can be significantly reduced.

Figure 8:
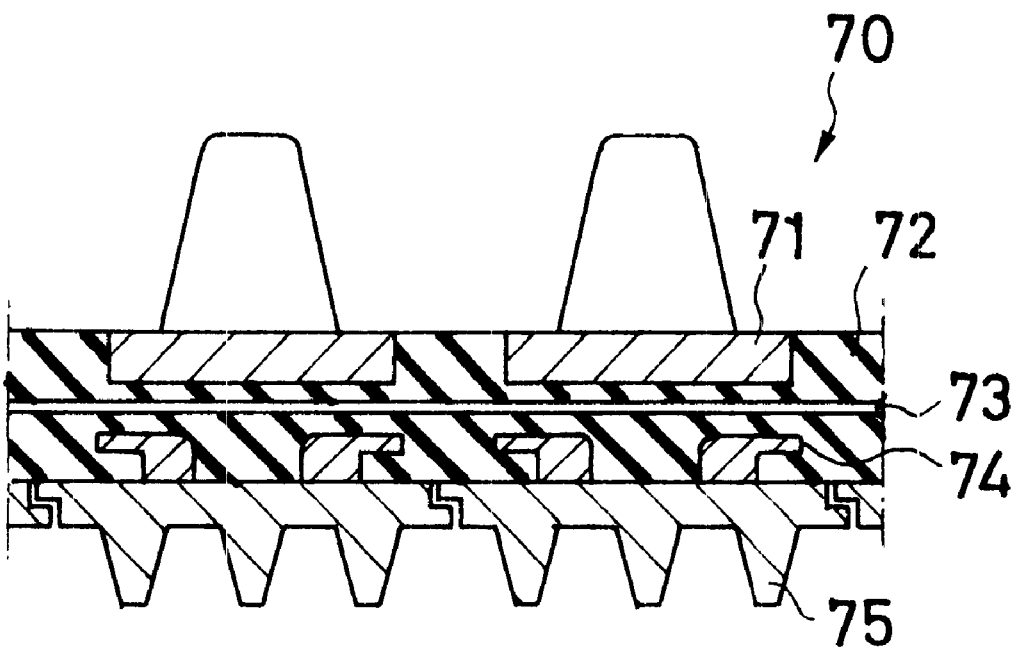
FIG. 8 is a cross section showing the structure of the crawler belt according to the third embodiment of the present invention.

In the aforementioned embodiments, although the outer shoes are integrally connected in a freely attachable and detachable manner to the inner shoes embedded in and connected integrally to a rubber belt member, it may also be structured as shown in FIG. 8. This crawler belt 70 is structured by integrally forming inner shoes 71 at the inner periphery of the belt member 72 reinforced with wires 73 embedded therein, and further embedding a shoe retainer 74 in the outer periphery of the belt member 72. The outer shoes 75 are connected to the shoe retainer 74 with the likes of a bolt. Further, it is also possible to integrally form the outer shoes 75 and the shoe retainer 74 by embedding and molding the entirety in the belt member 72.

As described above, according to the present invention, the inner shoe members are arranged side by side along the inner periphery of the belt member, the outer shoe members are arranged side by side along the outer periphery of the belt member, and concave portions are arranged in the longitudinal direction between the inner shoes and formed openly toward the inner periphery for receiving the sprocket teeth so that the crawler belt may be placed around the crawler wheel (sprocket wheel). As the crawler wheel contacts the steel inner shoe members and engages with the crawler belt, it is thereby possible to secure the strength of the portion contacting the crawler wheel and to improve the strength and durability of the crawler belt. Further, as the steel outer shoe members mounted on the outer periphery contact the road surface, it is also possible to improve the strength and durability of such portion. And when such steel outer shoe members become worn or damaged, it is possible to independently replace each of such outer shoe members. Repair may thereby be conduced easily and at low cost. In addition, as a rubber belt member is retained between the inner and outer shoe members and such inner and outer shoe members are mounted side by side in the longitudinal direction, the noise caused by the impact of the inner shoe members and the crawler wheel is absorbed by the rubber belt member, and the travel noise is reduced thereby. Moreover, as a wire member embedded in the belt member is formed in a ring shape so as to circumvent the crawler belt, the tensility of the wire member inhibits the crawler belt from being pulled inside upon being wound into the crawler wheel. Thus, the force of the impact of the inner shoe members and the crawler wheel is weakened, and the travel noise is reduced thereby.

It is preferable to structure the inner shoe members so that they are embedded in the belt member and integrated thereto in a state where the portion contacting the crawler wheel at the inner periphery and the portion connected to the outer shoe members at the outer periphery are exposed, and the outer shoe members are connected to the inner shoe members with bolts at the outer exposed portion of the inner shoe members. Thereby, it is possible to connect the inner shoe members in an endless ring shape while being arranged side by side on the inner face with the belt member, and a crawler belt may be prepared by respectively connecting the outer shoe members with bolts to the portion exposed to the outer face of the inner shoe members. Thus, it is possible to easily attach and detach the respective outer shoes independently. And when such outer shoe members contacting the road surface during the traveling motion become worn or damaged, it is possible to independently and easily replace each of such outer shoe members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising a travel dolly and a travel mechanism provided on the left and right sides of said travel dolly, wherein said travel mechanism comprises a front crawler wheel provided at a front part on left and right sides of said travel dolly, said front crawler wheel comprising sprocket teeth;

a rear crawler wheel provided at a rear part on left and right sides of said travel dolly; and a pair of left and right crawler belts mounted and driven around said front crawler wheel and said rear crawler wheel;

wherein said crawler belt comprises a plurality of inner shoe members made of steel; a plurality of outer shoe members made of steel and arranged to oppose said inner shoe members, respectively; an endless ring-shaped rubber belt member retained between said inner shoe members and outer shoe members respectively opposing each other; and an endless ring-shaped steel wire member embedded in said belt member so as to extend in a longitudinal direction; and wherein said inner shoe members are arranged side by side along an inner periphery of said belt member, while said outer shoe members are arranged side by side along an outer periphery of said belt member;

wherein said crawler belt includes a plurality of concave portions that are formed side by side in a longitudinal direction between said inner shoe members so as to open toward the inner periphery to receive the sprocket teeth of the front crawler wheel, so that the crawler belt is passed around the front crawler wheel and rear crawler wheel;

wherein said inner shoes are formed of rectangular members elongated toward a width direction of the crawler belt, and a midsection of an inner face being exposed to the inner periphery of the belt member and is provided with a pair of guide protrusions protruding inwards, and wherein the inner shoe members include left and right ends that are embedded in said belt member.

2. The vehicle according to claim 1, further comprising that a midsection of said inner shoes forms a constriction where the dimension is decreased in the longitudinal direction of the crawler belt, said concave portions are formed between said constrictions of adjacent said inner shoes, and said concave portions receive said sprocket teeth.

3. A low-noise type steel crawler belt that comprises an endless ring-shaped crawler belt adapted for being mounted on and driven by a front crawler wheel comprising sprocket teeth and a rear crawler wheel, said low-noise type steel crawler belt further comprising:

a plurality of inner shoe members made of steel;

a plurality of outer shoe members made of steel and arranged to oppose said inner shoe members, respectively;

an endless ring-shaped rubber belt member retained between said inner shoe members and said outer shoe members respectively opposing each other;

wherein said inner shoe members are arranged side by side along an inner periphery of said belt member, and said outer shoe members are arranged side by side along an outer periphery of said belt member;

wherein said crawler belt includes a plurality of concave portions that are formed side by side in a longitudinal direction between said inner shoe members so as to open toward the inner periphery to receive the sprocket teeth of the front crawler wheel, so that the crawler belt is passed around the front crawler wheel and rear crawler wheel; and wherein said inner shoes are formed of rectangular members elongated toward a width direction of the crawler belt, and a midsection of an inner face being exposed to the inner periphery of the belt member and is provided with a pair of guide protrusions protruding inwards, and wherein the inner shoe members include left and right ends that are embedded in said belt member.

4. A low-noise type steel crawler belt according to claim 3, wherein the midsection of said inner shoes forms a constriction where the dimension is decreased in the longitudinal direction of the crawler belt, said concave portions are formed between said constrictions of adjacent said inner shoes, and said concave portions receive said sprocket teeth.

5. A low-noise type steel crawler belt according to claim 3, wherein said inner shoe members are embedded in said belt member and integrated hereto into a state where the portion contacting said crawler wheel at the inner periphery and the portion connected to said outer shoe members at the outer periphery are exposed, and said outer shoe members are connected to said inner show members by means of bolts at the outer exposed portion of said inner shoe members.

6. A low-noise type steel crawler belt according to claim 5, wherein said outer shoe members are structured to be replaceable by disconnecting said bolt connection.

7. A low-noise type steel crawler belt according to claim 5, wherein the left and right sides of the outer face of said inner shoes are covered with said belt member while the midsection is left exposed to the outer face and female screws are formed on this exposed portion, and said outer shoe members are connected to said inner shoe members by using bolts which engage with said female screws.

8. A low-noise type steel crawler belt according to claim 5, wherein the left and right ends of said inner shoes are exposed to the inner and outer periphery of said belt member, bolt insertion holes are formed on said left and right ends so as to pass through said inner shoes from the inside to the outside, and said outer shoes are connected to said inner shoes at the left and right ends by means of bolt inserted in said bolt insertion holes in the left and right ends of the inner shoes and nuts screwed on these bolts.

* * * * *